(12) United States Patent
Iinuma

(10) Patent No.: US 8,131,167 B2
(45) Date of Patent: Mar. 6, 2012

(54) IMAGE PROCESSING APPARATUS AND IMAGE PROCESSING METHOD

(75) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 11/844,585

(22) Filed: Aug. 24, 2007

(65) Prior Publication Data

US 2008/0145069 A1    Jun. 19, 2008

(30) Foreign Application Priority Data

Dec. 13, 2006  (JP) ................. 2006-336033

(51) Int. Cl.
*G03G 15/00* (2006.01)
(52) U.S. Cl. .......................... 399/21; 399/388
(58) Field of Classification Search ..... 399/21; 358/1.16
See application file for complete search history.

(56) References Cited

U.S. PATENT DOCUMENTS

| | | | | |
|---|---|---|---|---|
| 6,667,816 B1 | 12/2003 | Van Buren et al. | ........ | 358/3.13 |
| 6,782,495 B2 | 8/2004 | Bernklau-Halvor | ........ | 714/44 |
| 7,161,694 B2 | 1/2007 | Saka et al. | ........ | 358/1.13 |
| 7,330,282 B2 | 2/2008 | Matsumoto | ........ | 358/1.15 |
| 7,382,472 B2 | 6/2008 | Wada | ........ | 358/1.1 |
| 2006/0088323 A1 | 4/2006 | Morisawa et al. | ........ | 399/21 |
| 2006/0164660 A1* | 7/2006 | Boyd et al. | ........ | 358/1.1 |
| 2006/0221381 A1* | 10/2006 | Morales | ........ | 358/1.15 |

FOREIGN PATENT DOCUMENTS

| | | |
|---|---|---|
| CN | 1524703 A | 9/2004 |
| CN | 1766892 A | 5/2006 |
| EP | 1 701 246 A2 | 9/2006 |
| JP | 2000293070 A * | 10/2000 |
| JP | 2001-026162 | 1/2001 |
| JP | 2001-341400 | 12/2001 |

OTHER PUBLICATIONS

"Page content insensitive job generation and analysis utility" IP.COM Journal, IP.COM Inc., West Henrietta, NY, US, Sep. 20, 2006, XP013115866 ISSN: 1533-001.
Official Letter/Search Report, issued by the European Patent Office, on Feb. 21, 2008, in European Application No. 07115089.0.
Official Letter/Search Report (Translation), dated Jul. 3, 2009, issued by The State Intellectual Property Office of P.R. China, in Chinese Application No. 2007101459791.

* cited by examiner

*Primary Examiner* — Daniel J Colilla
*Assistant Examiner* — Allister Primo
(74) *Attorney, Agent, or Firm* — Fitzpatrick, Cella, Harper & Scinto

(57) ABSTRACT

An image processing apparatus and image processing method for preventing a paper jam in print output are provided. First, when printing is instructed, it is judged whether paper jam exists. Next, when occurrence of paper jam is recognized based on the judgment, information related to an object is obtained. Next, when a paper jam occurs, the information is added to information of each object. Additionally, when each object is reused, it is judged whether there is a possibility that a paper jam will occur again, based on the information added.

11 Claims, 15 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method, in particular, to an image processing apparatus and an image processing method for preventing paper jam in print output of a color multi-function peripheral.

2. Description of the Related Art

Recently, a color multi-function peripheral (hereinafter, referred to as color MFP) has been highly utilized in offices and print shops. The color MFP has a copy function for copying a document, a PDL function capable of printing out a document created by a host computer, and a sending function for sending a document externally from the color MFP via a network. Additionally, color output is possible for all the functions.

Problems of the print output in the copy function and PDL function of the color MFP include paper jam. A representative example which causes paper jam is rolling-in of paper in a fixing unit. A paper jam may occur as a result of rolling-in, when a rectangle (toner application amount is large) having a high density is drawn at the leading edge in the paper carriage direction, paper is not separated from the fixing unit and the paper is rolled-in when it is separated from the fixing unit after the toner is fixed to the paper by the fixing unit.

In order to solve such a paper jam, an image forming apparatus disclosed in Japanese Patent Laid-Open No. 2001-026162 measures each density of areas adjacent to four sides of bit map data corresponding to a paper size developed on a memory. The apparatus is structured so that the measured densities of the four sides are compared with each other, the bit map data is turned so that the area having the largest density is not positioned at the leading edge of the paper, and then the data is printed out.

That is, a peripheral part image density processing part detects each average density of peripheral parts of the four sides of an image for one page which is formed based on digital image signals stored in a memory 33. The detected average densities of the peripheral parts of the four sides are compared with a predetermined reference range, and the average density within the predetermined reference range is selected. The peripheral part image density processing part places the peripheral part corresponding to the selected average density at the top, reads out the digital image signal from the memory, and forms the image for one page from the top.

Additionally, in addition to the above described method for preventing paper jam, for example, a method is used that is disclosed in Japanese Patent Laid-Open No. 2001-341400. In the method, image information for each page is read out from the image information stored in a document memory, and the amount of the image information of a predetermined region on the leading edge of the read image information for one page in the paper carriage direction is compared with the amount of the image information of a predetermined region on the rear edge side thereof. When the amount of the image information of a predetermined region on the leading edge is larger than the amount of the image information of a predetermined region on the rear edge side, an image information output to a printing part is reversed by 180°. Thus, the image information at the leading edge of the paper is reduced, and the frequency of occurrence of a paper rolled-in jam is reduced.

However, in the above described method for preventing paper jam disclosed in Japanese Patent Laid-Open No. 2001-026162, the following problems remain: (1) it is required to constantly measure the density; (2) there is a possibility that bit map data is turned even in the case of not being required to be turned.

Additionally, for the color MFP, in consideration of reuse of components (referred to as object, hereinafter) of a document, a storing means is proposed that stores information in a storage unit in the color MFP not by the document unit but by each object.

In the above constitution, since a user who reuses the object is not limited to a creator of the object, there is a possibility that other users use the object. When the toner application amount of the object (the toner amount applied for the object) is large and the printing position of the object is set to the leading edge of the paper, paper jam is likely to occur.

That is, there remains another problem (3) that other users must know, in advance, the possibility that the object causes paper jam.

SUMMARY OF THE INVENTION

The present invention was made in view of the above problems, and it is an object of the present invention to provide an image processing apparatus and image processing method for preventing paper jam in print output.

In order to achieve the above object, the present invention provides an image processing apparatus comprising: a storage for storing an object constituting a document, and information related to the object; first judging means for judging whether paper jam occurs in print output of the document; storage controlling means for controlling the storage so as to store information related to the paper jam as information related to the object constituting the document, in which the paper jam occurs, in the case where the first judging means judges the paper jam occurs; and second judging means for judging whether there is a possibility that a paper jam will occur, based on the information related to the object, in reusing the object.

Additionally, the present invention provides the image processing method of the image processing apparatus including a storage for storing an object constituting a document, and information related to the object, the method comprising the steps of: judging whether the paper jam occurs in print output of the document; controlling the storage to store information related to the paper jam as information related to the object constituting the document, in which the paper jam occurs, in the case where it is judged that the paper jam occurs; and judging whether there is a possibility that a paper jam will occur, based on the information related to the object, when the object is reused.

As described above, the image processing apparatus of the present invention can store information in a storage unit by each object, and is a color MFP capable of reusing the object. Additionally, when a paper jam occurs, at least one of an occurrence place of the paper jam, used paper type, printing position, and information of other objects in the paper jam is described on meta-data attached to the object.

Additionally, the image processing apparatus of the present invention reuses the object, when a document is created and printed out, checks the meta-data attached to the object, when printing is instructed, and compares a description related to the paper jam with the current print setting. In the case where there is a possibility that a paper jam will occur again, a user interface for a warning is displayed on a screen so as to allow the user to select a solving means, and thus the possibility that a paper jam will occur can be reduced.

Further, the image processing apparatus of the present invention automatically processes the object, which may result in paper jam again, in accordance with the preset setting of the color MFP, so as to reduce the possibility that a paper jam will occur.

Furthermore, the image processing apparatus of the present invention can store information (meta-data) corresponding to each object in the storage unit by each object, and reuse the object. Information related to the paper jam is stored in the meta-data so that subsequent paper jams can be prevented.

Additionally, when an object stored in the storage unit is reused, the possibility that a paper jam will occur is estimated based on meta-data attached to the object so as to urge the user to change the setting in detail.

Additionally, when an object stored in the storage unit is reused, the possibility that a paper jam will occur is estimated based on the meta-data attached to the object, preset measures are automatically applied to the object so as to prevent paper jam.

Further features of the present invention will become apparent from the following description of exemplary embodiments (with reference to the attached drawings).

DESCRIPTION OF THE EMBODIMENTS

Embodiments of the present invention will be described below with reference to the drawings.

First Embodiment

Figure 1:
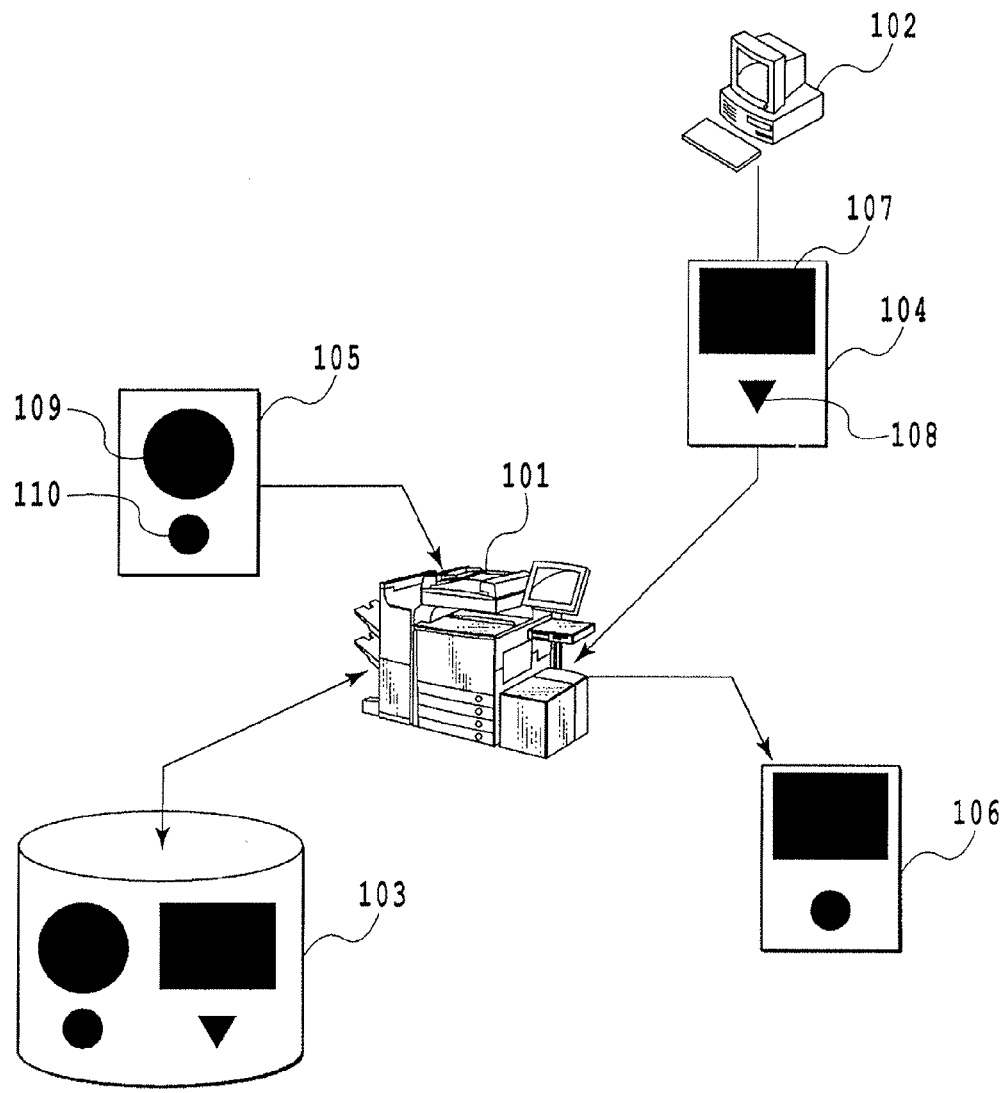
FIG. 1 is a conceptual diagram of an image processing apparatus according to the present invention.

FIG. 1 is a conceptual diagram of an image processing apparatus according to the present invention, and is a schematic diagram showing a color MFP capable of storing each object in a storage unit and reusing the object.

A user can use a copy function of copying a document 105 by use of a scanner mounted on the color MFP 101. At this time, if it is desired by a user, the color MFP 101 according to the present invention analyzes the document 105, separately extracts objects 109 and 110 constituting the document 105, and thus can store the objects in a storage unit 103. Moreover, the objects such as a text region, drawing region and photograph region can be extracted from the document 105 by use of a known technology (region division technology, etc).

Additionally, a host computer 102 can print out image data 104 created by application software or the like in accordance with operation of the user via a printer driver. At this time, depending on the user's desire, the color MFP 101 according to the present invention can separately store objects 107 and 108 of the image data (document) 104 to be printed out in the storage unit 103.

These stored objects can be reused on a screen of a control panel of the color MFP 101 or on a screen of the host computer 102. For example, the objects 107 and 110 are reused on the screen of the control panel of the color MFP 101 so that a document 106 can be created and printed out.

[Storage by Each Object]

Figure 2:
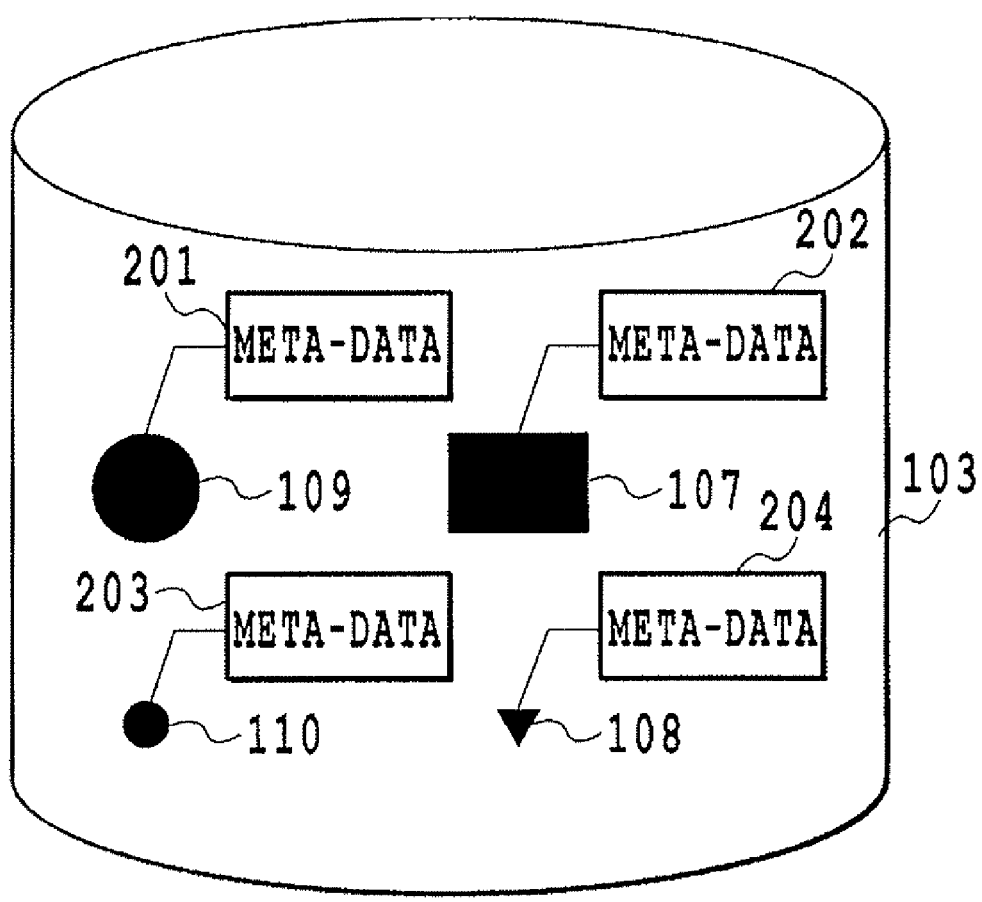
FIG. 2 is a block diagram of a storage unit shown in FIG. 1.

FIG. 2 is a diagram of the storage unit shown in FIG. 1. Each object constituting a document can be stored in the storage unit 103. Meta-data can be attached to each object, the meta-data indicating a feature of the object. Meta-data 201, 202, 203 and 204 are attached to the objects 109, 107, 110 and 108 respectively.

[Meta-Data]

Figure 3:
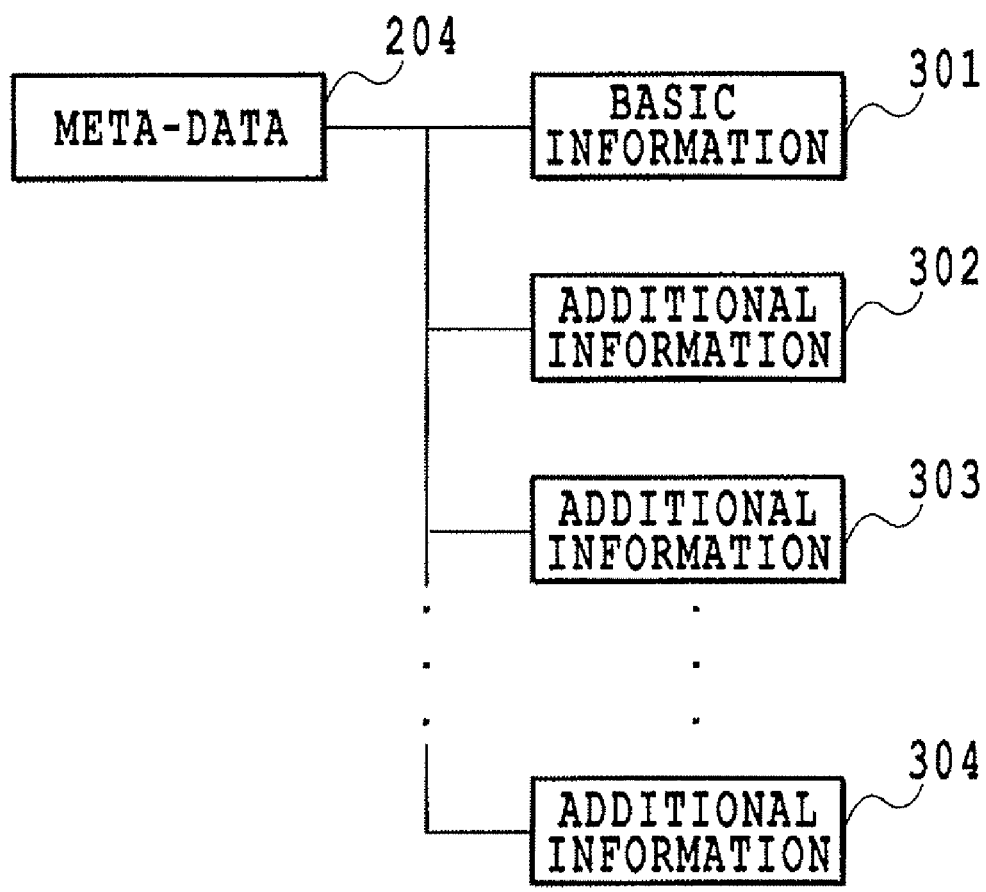
FIG. 3 is a block flow diagram of meta-data shown in FIG. 2.

FIG. 3 is a diagram of the meta-data shown in FIG. 2. The meta-data 204 is hierarchical. For example, a creation date and a creator of the object are described in basic information 301, and a form of the object and the like are described in additional information 302. The reason why the meta-data is hierarchically structured is that security levels can be changed in accordance with the hierarchy and information anyone can read being separated from information only a specific user can read. Paper jam information according to the present invention is included in the additional information. Moreover, the meta-data 204 is described by use of a description language such as XML. However, the describing method is not limited to the above method.

[The Case Where Paper Jam Occurs]

Figure 5:
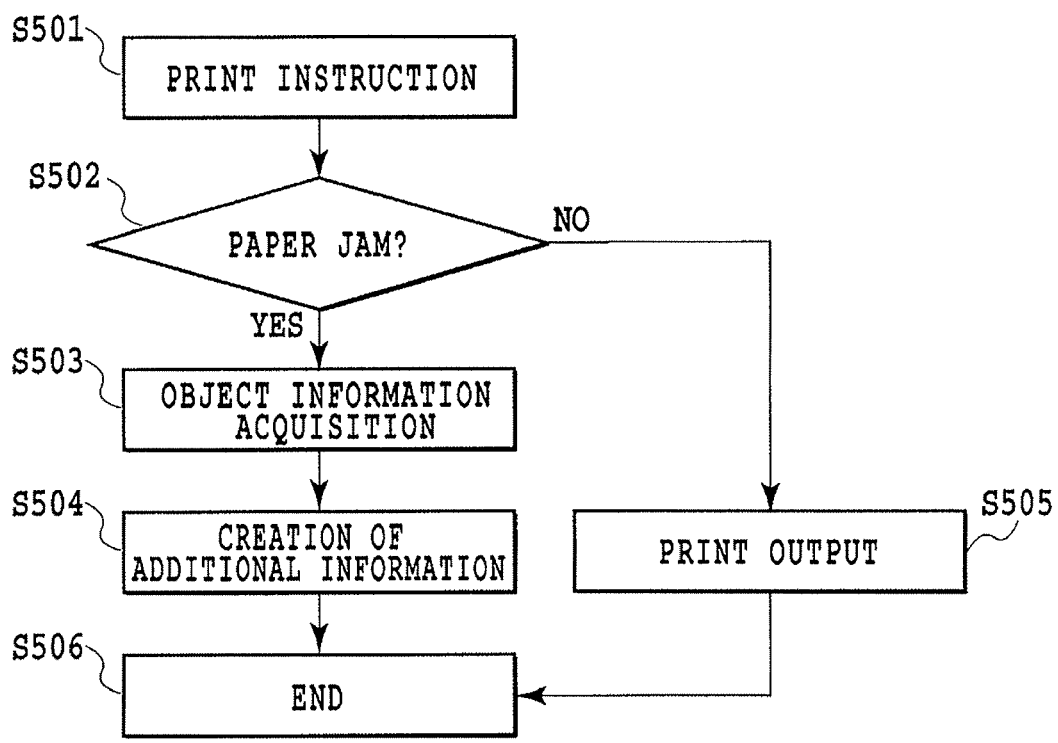
FIG. 5 is a flowchart related to creation of meta-data of the present invention.

FIG. 5 is a flowchart related to creation of the meta-data in the present invention.

It is assumed that the paper jam occurs when the document 104 created by the host computer 102 is printed out by the color MFP 101. First, the user instructs the color MFP to print out the document in Step 501. Here, it is assumed that the storage unit 103 of the color MFP 101 is set by the user so as to store the objects 107 and 108 constituting the document 104 therein.

Next, in Step 502, it is judged whether paper jam exists. When it is judged that the paper jam exists, information of the meta-data 202 and 204 of the objects 107 and 108 is obtained in Step 503.

Figure 6:
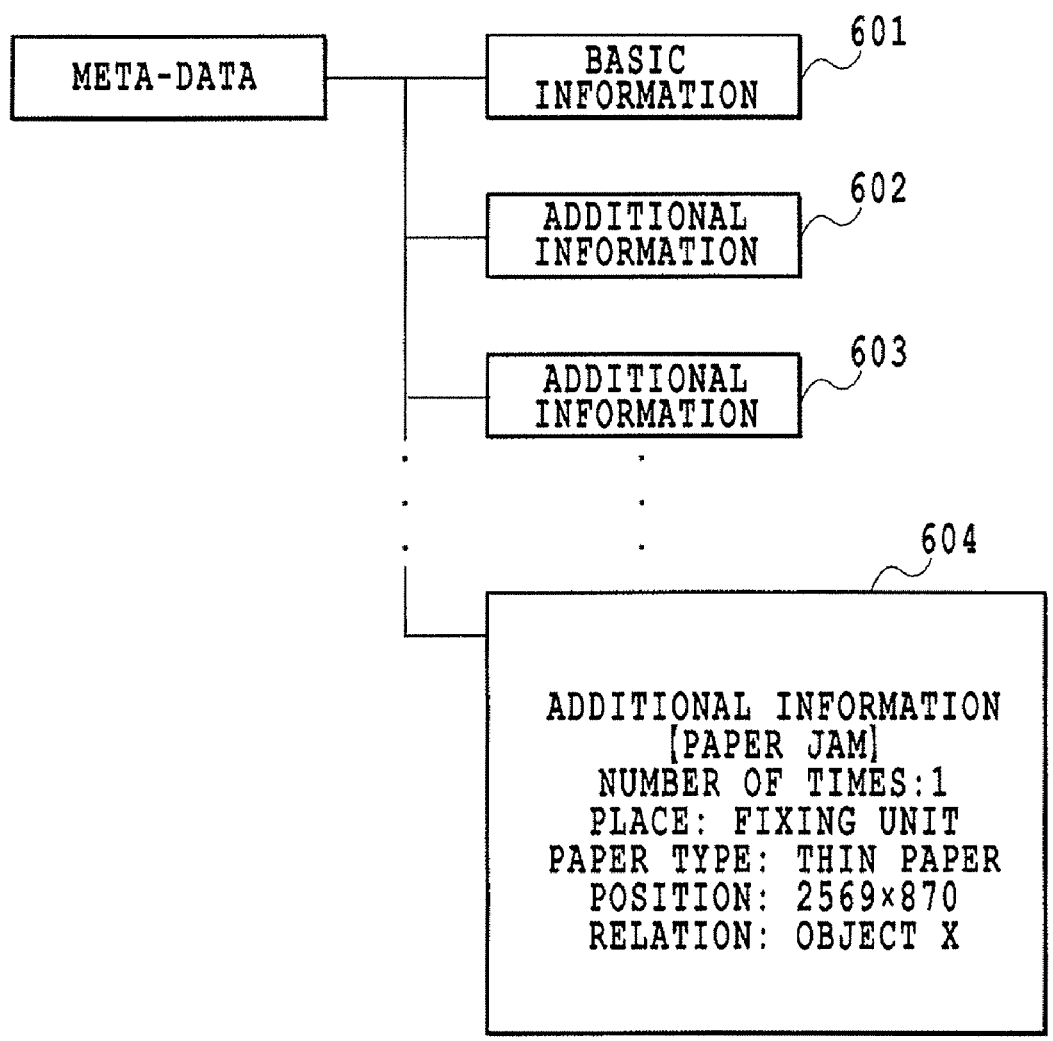
FIG. 6 is a diagram for explaining a constitution of the meta-data of the present invention.

In Step 504, the information related to paper jam is additionally described in the meta-data. The meta-data at this time becomes as shown in FIG. 6, and the information related to the paper jam is stored as additional information 604. Information of an occurrence place of the paper jam, the set paper type, a planned printing position, other objects constituting the document 104, and the like are added to the information related to the paper jam. Moreover, in this case, since the paper jam occurs, the document cannot be printed out, and a process of creating the meta-data ends in Step 506.

[The Case Where No Paper Jam Occurs]

On the other hand, when it is judged, in Step 502, that no paper jam occurs, the document is normally printed out in Step 505, and the process ends in Step 506. Additionally, in the storage unit 103 of the color MFP 101, the information 604 related to the paper jam is not described, but the objects 107 and 108 are stored.

[Reuse by Host Computer]

Figure 8:
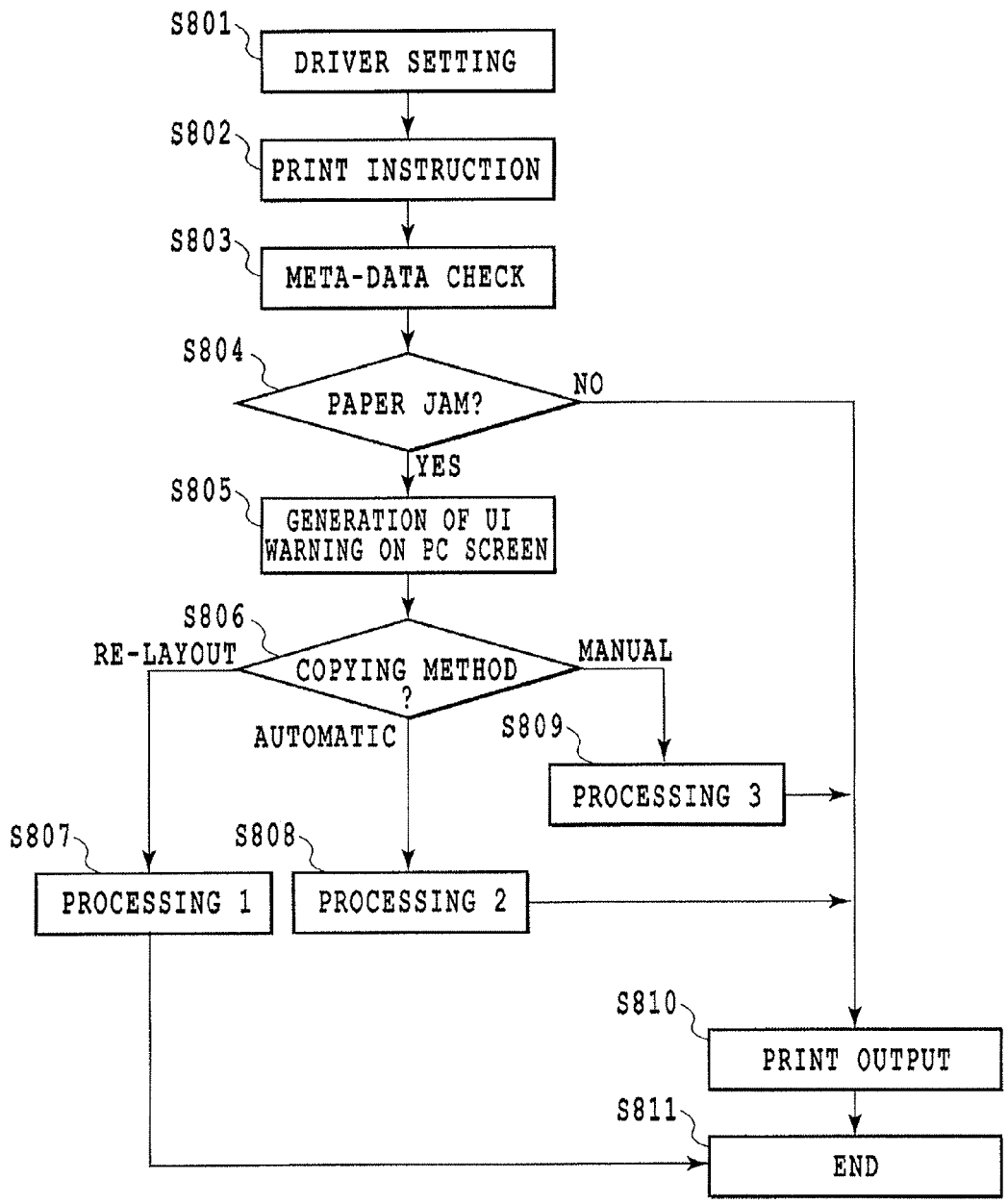
FIG. 8 is a flowchart indicating a case where an object is reused by use of the host computer of the present invention.

FIG. 8 is a flowchart indicating a case where an object is reused by use of the host computer of the present invention.

Figure 4:
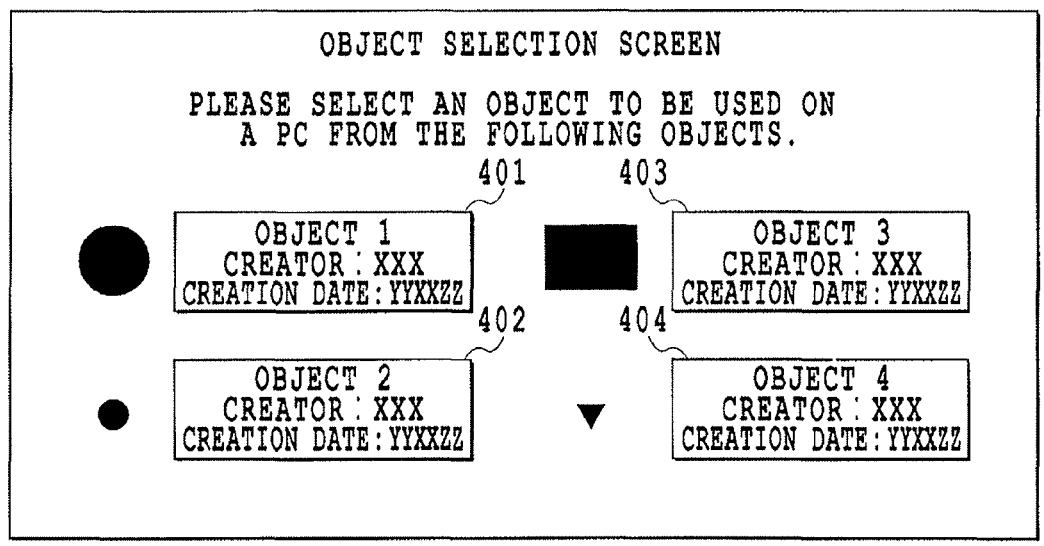
FIG. 4 is a diagram showing an example of messages displayed on a screen of a host computer.

When the user reuses the objects stored in the storage unit 103 of the color MFP 101 by use of the host computer 102, FIG. 4 is displayed on the screen of the host computer, and a list of usable objects can be read. Information of the creator and the creation date is described on each object.

As shown in FIG. 4, the reference symbols 401, 402, 403 and 404 show descriptions of the objects 109, 110, 107 and 108 respectively. The user selects an object to be reused from the list.

At this time, the object 107 is assumed to be selected. The selected object 107 is transmitted to the host computer 102 together with the attached meta-data 202. The object 107 can be reused by use of application software, etc., on the host computer receiving the object 107 and meta-data 202.

Moreover, the object 107 holds the additional information 604 of the meta-data since paper jam has been previously caused under a certain condition.

When the document 106 newly created by the host computer 102 is printed, the printer driver is set in Step 801.

Setting items includes paper related items (paper type and size), the number of sheets, color setting (color or monochrome) and the like. In Step 802, a print button on the printer driver is pressed down by the user so that print action starts. First, a display list is created by the driver and transmitted.

Next, in Step 803, the meta-data attached to each object is checked. At this time, the description of the additional information 604 related to the paper jam is recognized while the meta-data 202 of the object 107 is checked.

In Step 804, it is checked whether the current setting has a possibility that a paper jam will occur again by comparing with the additional information 604 related to the paper jam obtained in Step 803. The printing position of the object 107 set at this time, etc., are checked in addition to the items set in the printer driver.

Figure 9:
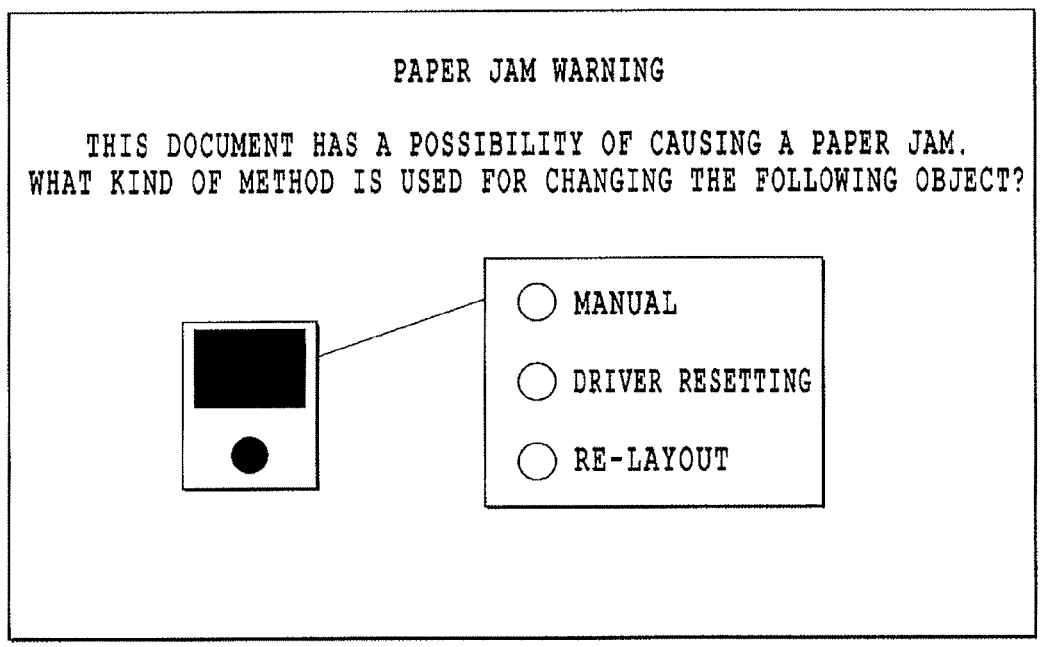
FIG. 9 is a diagram showing an example displayed on the host computer.

As a result, if there is a possibility that a paper jam will also occur at this time, a warning message is displayed on the screen of the host computer 102 in Step 805 as shown in FIG. 9. In Step 806, a desired solution is selected by the user from three solutions shown in FIG. 9.

Next, when "re-layout" is selected in Step 806, the created display list is eliminated, and the layout in the application is performed again, in processing 1 of Step 807. Then, the process ends in Step 811.

Figure 10:
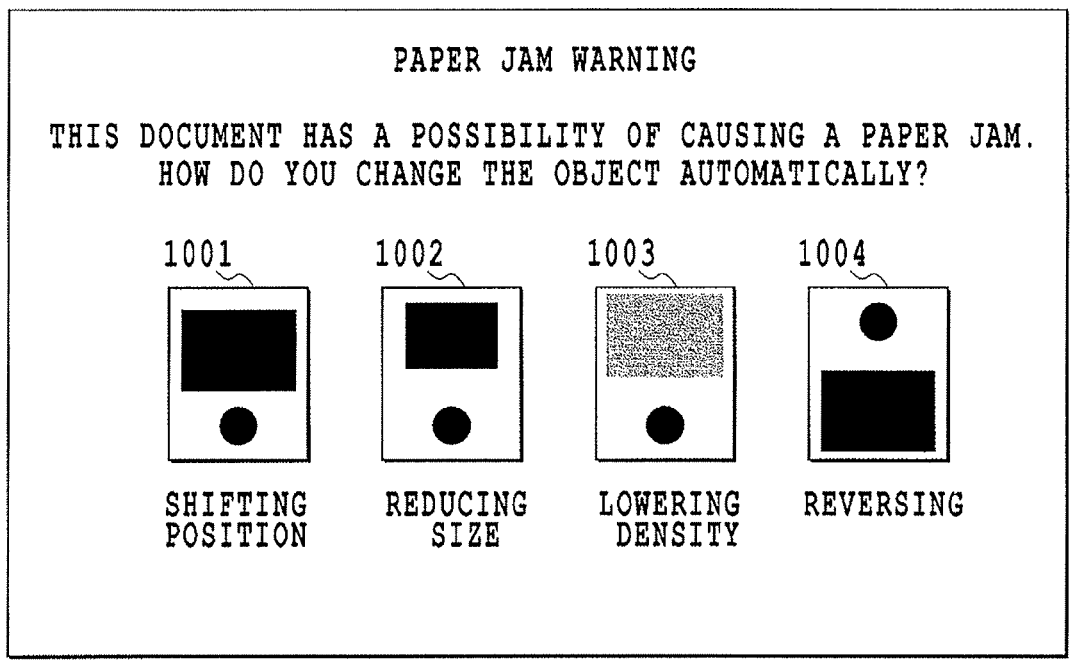
FIG. 10 is a diagram showing an example displayed on the host computer.

Next, when "automatic" is selected in Step 806, a job is processed in accordance with a measure in "automatic" preset by the user in processing 2 of Step 808. When the measure in "automatic" is preset by the user, a warning is displayed on the screen of the host computer 102 as shown in FIG. 10. The user can select, in advance, any of four measures 1001 to 1004 shown in FIG. 10.

The setting 1001 is a setting that the printing position of the object 107 having a possibility that a paper jam will occur is shifted downward and the object is printed out. Additionally, the setting 1002 is a setting that the object 107 having a possibility that a paper jam will occur is scaled down before printing out. In the settings 1001 and 1002, the printing position (the vicinity of the leading edge in a carriage direction) having a high possibility that a paper jam will occur is avoided.

The setting 1003 is a setting that the application amount (toner amount, ink amount) in printing the object 107 having a possibility that a paper jam will occur is reduced for printing out. The setting 1004 is a setting that a document image is vertically reversed so that the object 107 having a possibility that a paper jam will occur is not positioned at the leading edge in the carriage direction. In Step 808, processing is performed, in accordance with the setting selected from the four settings in advance, the object is printed out in Step 810, and the process ends in Step 811.

Figure 11:
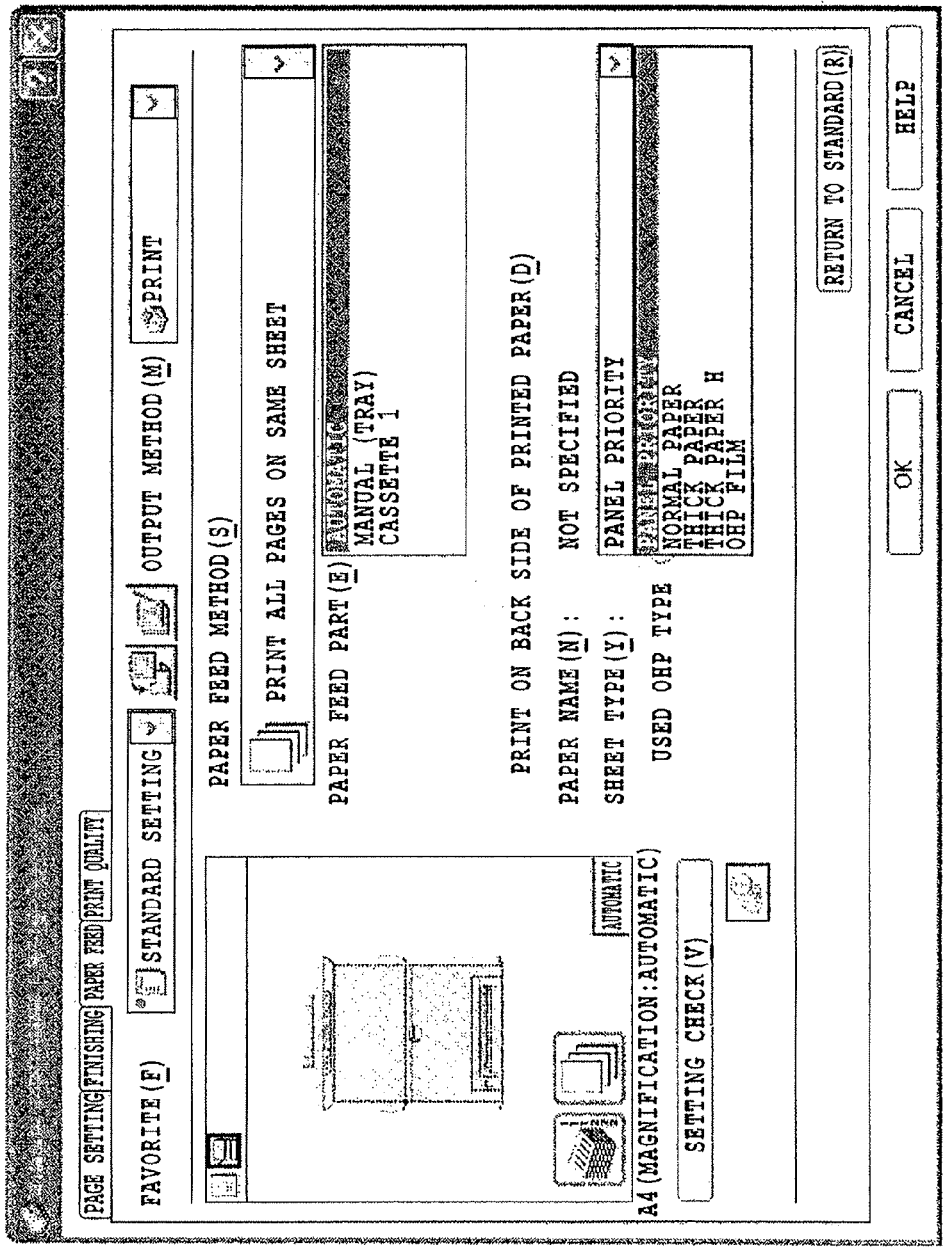
FIG. 11 is a view showing an example displayed on the host computer.

When "manual (driver reset)" is selected in Step 806, in the processing 3 in Step 809, the created display list is eliminated, and a setting screen of the driver shown in FIG. 11 is displayed on the screen of the host computer 102. In Step 804, as the driver setting having a possibility that a paper jam will occur is clearly indicated on the screen shown in FIG. 11, the user changes the setting and inputs the print instruction again. In this case, for example, the paper type is changed in accordance with "paper type," and the driver is set so that no paper jam occurs. Then, the document is printed out in Step 810, and the process ends in Step 811.

On the other hand, when it is judged, in Step 804, there is no possibility that a paper jam will occur, the document is printed out in Step 810, and the process ends in Step 811.

As described above, according to the present invention, paper jam in the print output can be prevented in the image forming apparatus including storing means for storing the objects constituting a document and information related to each object.

Second Embodiment

The print output can be controlled not only on the screen of the host computer 102 but also on the screen of the control panel of the MFP 101.

[Reuse in MFP Main Body]

Figure 14:
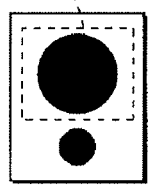
FIG. 14 is a diagram showing an example displayed on the control panel.

First, the last document copied by the copy function is displayed by page. An example of display is shown in FIG. 14. The document 105 is used, and the objects 109 and 110 are used. The user specifies a range 1401 of an object to be changed and the peripheral thereof on the screen shown in FIG. 14 with a touch pen, etc. The object (object 109 in this case) in the specified range 1401 is judged, and set as a part to be changed.

Figure 7:
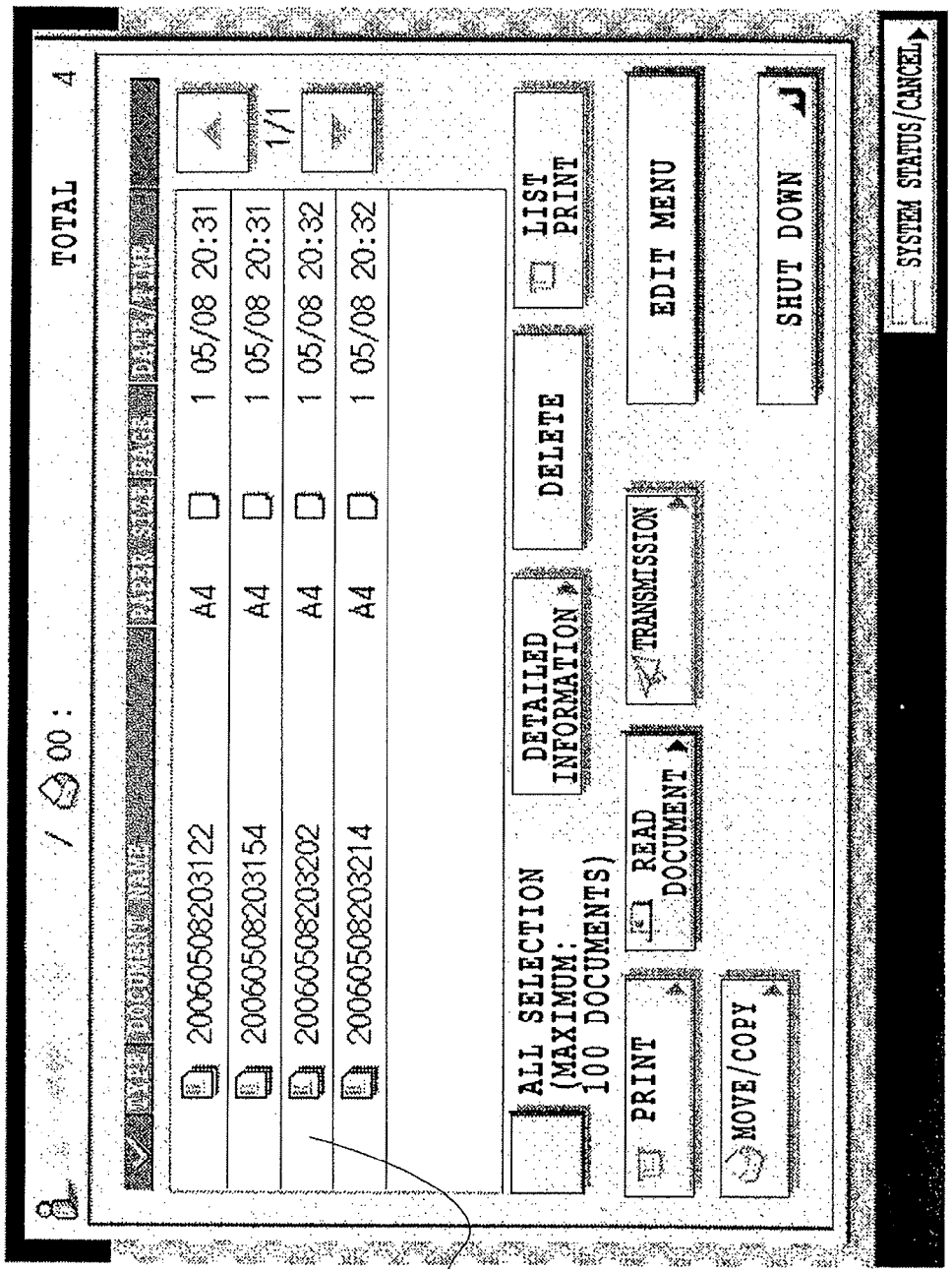
FIG. 7 is a view showing an example of display on a control panel.
Figure 15:
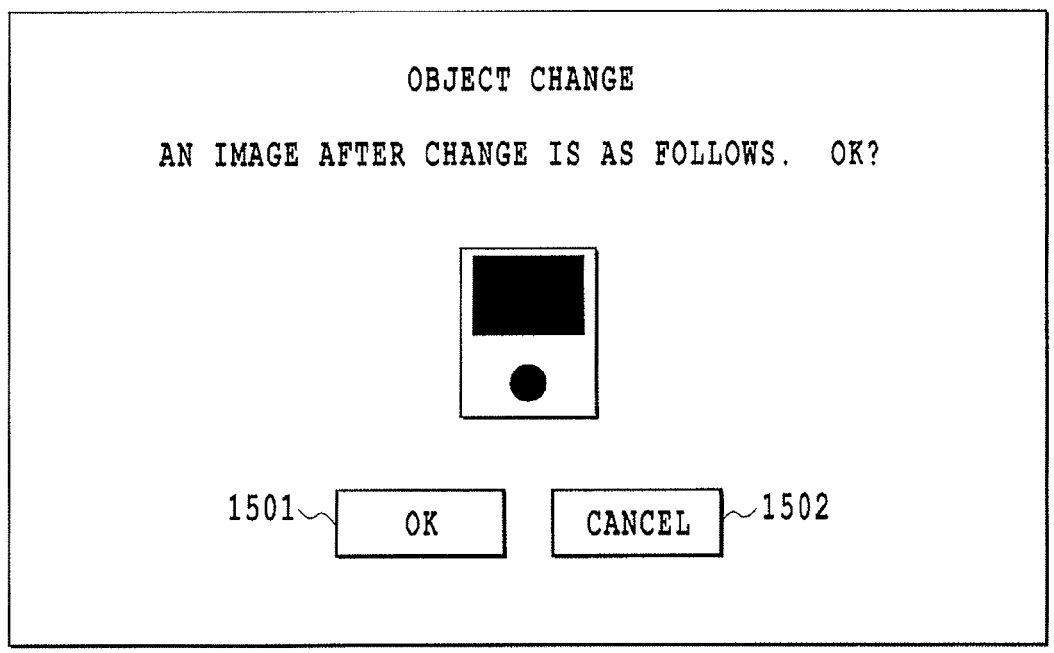
FIG. 15 is a diagram showing an example displayed on the control panel.

Next, an object selection screen for changing the specified object 109 is displayed as shown in FIG. 7. The user selects an object in the storage unit 103 of the MFP 101 from an object list 701. When the object is selected, a preview and information of the object can be seen. In this case, the object 107 is assumed to be selected. An example of previews displayed on the control panel screen of the MFP 101 after a change is shown in FIG. 15. Herein, the object 109 is replaced with the object 107.

The user can check the last image after a change on the screen shown in FIG. 15. If there is no problem in the last image, a button 1501 is pressed down, and the new document 106 is created and printed out. On the other hand, when the user hopes to further correct the last image, a button 1502 is pressed down. Then, the display returns to the view shown in FIG. 14, and change of the object is carried out again.

Figure 13:
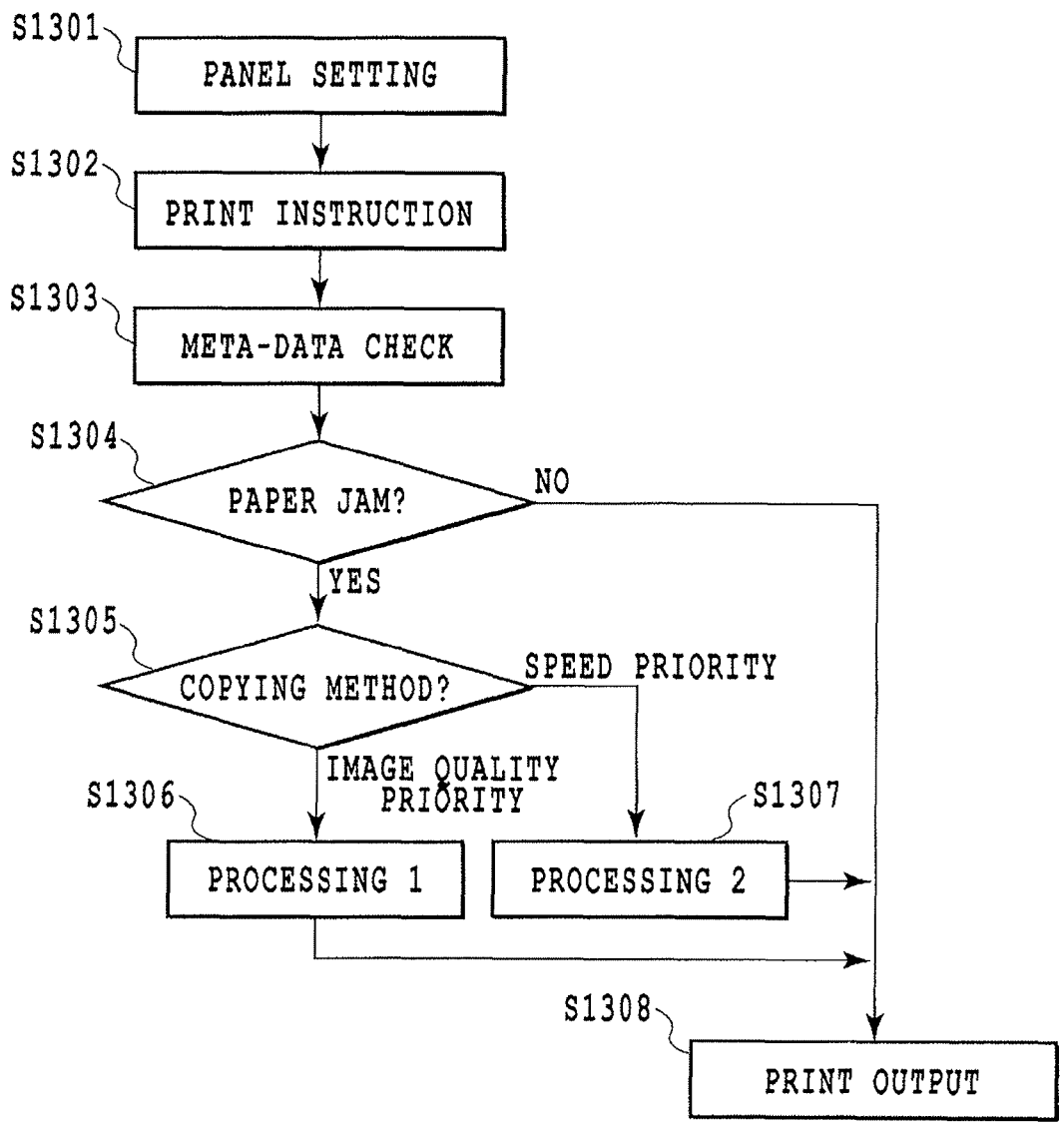
FIG. 13 is a flowchart indicating a case where an object is reused by use of a color MFP according to the present invention.

FIG. 13 is a flowchart indicating a case where the object is reused by use of the color MFP according to the present invention.

First, setting for print output is performed in Step 1301. The setting items include paper related items (paper type and size), the number of sheets, color setting (color or monochrome) and the like. In Step 1302, a start button of the MFP 101 is pressed down to start print action. Next, in Step 1303, the meta-data attached to each object is checked. In this case, the information 604 related to paper jam is recognized while the meta-data 202 of the object 107 is checked.

Next, in Step 1304, it is checked whether the setting has a possibility that a paper jam will occur again by comparing with the information 604 related to paper jam obtained in Step 1303. As a result, if there is a possibility that a paper jam will also occur at this time, the setting selected in advance is judged in Step 1305. In Step 1305, no message is set to be displayed on the screen of the control panel of the MFP 101.

Figure 12:
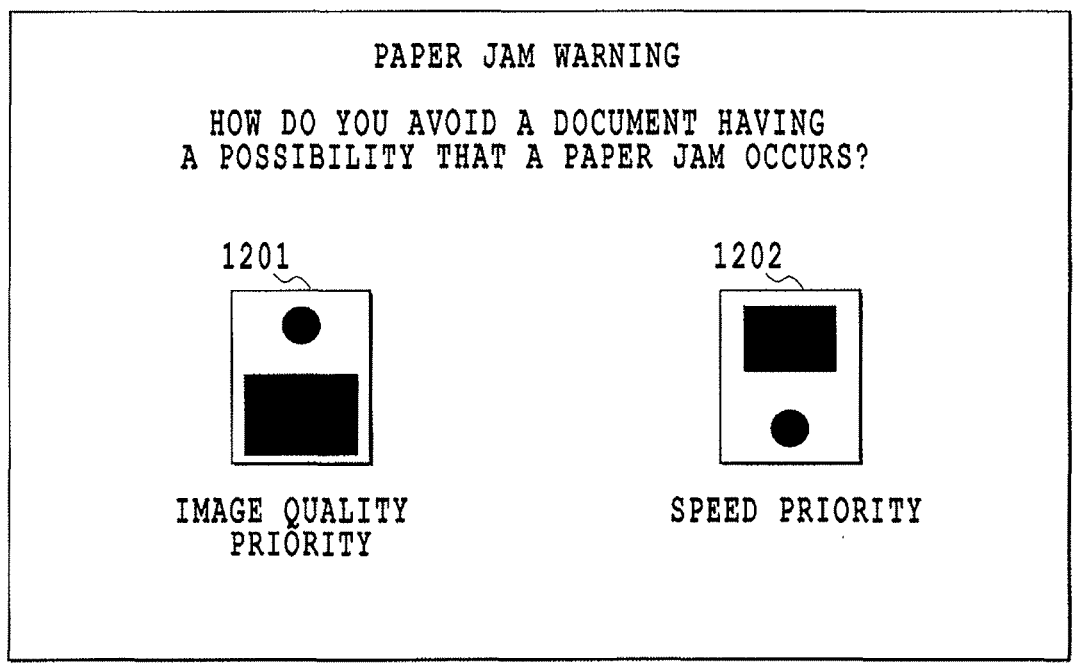
FIG. 12 shows an example of the display on the control panel.

Processing is automatically changed, not manually changed as the host computer 102, because it is difficult to carry out fine work such as position shift on the control panel screen of the MFP 101. Additionally, other users are affected by long time occupation of the control panel of the MFP 101. Accordingly, automatic processing is employed. In this case, the way of automatic processing is determined in advance on the screen shown in FIG. 12. Moreover, when the user performs presetting in advance, a message shown in FIG. 12 is displayed on the screen of the control panel of the MFP 101, and the setting specified on the screen is used. In the embodiment, image quality priority of setting 1201 and speed priority of setting 1202 are provided, and one of the settings is selected by the user in advance.

A copying method is determined based on the setting judged in step 1305. When it is judged in step 1305 that the setting 1202 (speed priority) is set, in Step 1307, the print speed is not reduced, and the image data is not turned on the memory at the cost of image quality by, for example, reducing the application amount. This is because a calculation amount in the case where the image data is turned on the memory is larger than that in the case where the image data is not turned, and thus the print speed is reduced. Then, the print output is performed in Step 1308.

On the other hand, when it is judged in step 1305 that the setting 1201 (image quality priority) is set, a desired image quality is given priority at the cost of print speed in Step 1306. Specifically, the image data is reversed on the memory, and the print output is performed in Step 1308.

Additionally, when it is judged, in Step 1304, there is no possibility that a paper jam will occur again, the print output is performed in Step 1308.

Other Embodiment

The image processing apparatus of the first embodiment or second embodiment can be realized by the following constitutions (moreover, not limited to the following constitutions):

For example, electronic circuits (hardware) corresponding to the processing (procedure) of each step are used so that the image processing apparatus (MFP) performs processing in accordance with each procedure of the above-described flowchart.

If the image processing apparatus (MFP) includes a central processor unit (CPU), and a storage medium (RAM, ROM, hard disk or the like), a computer program stored in the storage medium is executed by the CPU so that each procedure of the above-described flowchart is performed by the CPU (computer).

A part of the functions of the above embodiments is realized by hardware (electronic circuit), and other functions are realized by software (the computer program executed by the CPU).

As described above, a program, which allows the CPU (computer) to perform all or a part of the procedures of the embodiment, is stored in the storage medium readable by the computer. In this case, the present invention includes the computer program and storage medium for making the computer realize the procedures of the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-336033, filed Dec. 13, 2006, which is hereby incorporated by reference herein in its entirety.

What is claimed is:

1. An image processing apparatus comprising:
   a storage unit for separately storing objects constituting a document, the objects including at least one of a text object, a drawing object, and a photograph object, and storing multiple pieces of meta-data information related to the objects;
   a first judging unit configured to judge whether a paper jam occurs in print output of the document;
   a storage controlling unit configured to control the storage unit so as to store information related to a paper jam as the meta-data information related to the objects constituting the document, in which the paper jam occurs, in the case where the first judging unit judges that a paper jam occurs; and
   a second judging unit configured to judge whether there is a possibility that a paper jam will occur, based on the meta-data information related to the objects, in reusing any of the objects for constituting a new document.

2. The image processing apparatus according to claim 1, wherein the information related to paper jam is at least one of a jam place of paper jam, printing position, paper type and information of the other objects constituting the document.

3. The image processing apparatus according to claim 1, further comprising:
   a display controlling unit configured to control the apparatus so as to display a warning and messages urging the user to take measures, in the case where the second judging unit judges there is a possibility that a paper jam will occur; and
   a selecting unit configured to allow the user to select a measure.

4. The image processing apparatus according to claim 1, further comprising an automatic processing unit configured to automatically process in accordance with a preset measure in the case where the second judging unit judges that there is a possibility that a paper jam will occur.

5. The image processing apparatus according to claim 4, further comprising a setting unit configured to allow a user to preset a measure for the automatic processing unit in advance.

6. The image processing apparatus according to claim 3, wherein the display controlling unit is displayed on at least any of the screen of a host computer and the screen of a control panel.

7. An image processing method of an image processing apparatus equipped with a storage unit for separately storing objects constituting a document, the objects including at least one of a text object, a drawing object, and a photograph object, and storing multiple pieces of meta-data information related to the objects, the method comprising the steps of:

a first judging step of judging whether a paper jam occurs in print output of the document;

a storage controlling step of controlling the storage unit so as to store information related to a paper jam as the meta-data information related to the objects constituting the document, in which the paper jam occurs, in the case where it is judged that a paper jam occurs in the first judging step; and a second judging step of judging whether there is a possibility that a paper jam will occur, based on the meta-data information related to the objects, in the case where each of the objects is reused for constituting a new document.

8. A non-transitory computer-readable storage medium storing a computer program making a computer of an apparatus equipped with a storage unit for separately storing objects constituting a document, the objects including at least one of a text object, a drawing object, and a photograph object, and storing multiple pieces of meta-data information related to the objects, to execute the steps of:

a first judging step of judging whether a paper jam occurs in print output of the document;

a storage controlling step of controlling the storage unit so as to store information related to paper jam as the meta-data information related to the objects constituting the document, in which the paper jam occurs, in the case where it is judged that a paper jam occurs in the first judging step; and a second judging step of judging whether there is a possibility that a paper jam will occur, based on the meta-data information related to the object in the storage medium, in the case of each of the objects is reused for constituting a new document.

9. An image processing apparatus comprising:

a storage unit for separately storing objects constituting a document, the objects including at least one of a text object, a drawing object, and a photograph object, and storing multiple pieces of meta-data information related to the objects;

a judging unit configured to judge whether a paper jam occurs in print output of the document;

a storage controlling unit configured to control the storage unit so as to store information related to a paper jam as the meta-data information related to the objects constituting the document, in which the paper jam occurs, in the case where the judging unit judges that a paper jam occurs.

10. An image processing method implemented in an image processing apparatus, the method comprising:

a storage step of separately storing in a storage unit objects constituting a document, the objects including at least one of a text object, a drawing object, and a photograph object, and storing multiple pieces of meta-data information related to the objects;

a judging step of judging whether a paper jam occurs in print output of the document;

a storage controlling step of controlling the storage unit so as to store information related to a paper jam as the meta-data information related to the objects constituting the document, in which the paper jam occurs, in the case where the judging step judges that a paper jam occurs.

11. A non-transitory computer-readable storage medium storing a computer program for performing an image processing method, the method comprising:

a storage step of separately storing in a storage unit objects constituting a document, the objects including at least one of a text object, a drawing object, and a photograph object, and storing multiple pieces of meta-data information related to the objects;

a judging step of judging whether a paper jam occurs in print output of the document;

a storage controlling step of controlling the storage unit so as to store information related to a paper jam as the meta-data information related to the objects constituting the document, in which the paper jam occurs, in the case where the judging step judges that a paper jam occurs.

* * * * *